(12) United States Patent
Habibi et al.

(10) Patent No.: US 10,705,267 B2
(45) Date of Patent: Jul. 7, 2020

(54) FRAMELESS PRISMATIC MIRROR WITH IMPROVED EDGE PROTECTION

(71) Applicant: MAGNA MIRRORS OF AMERICA, INC., Holland, MI (US)

(72) Inventors: Hamid Habibi, Holland, MI (US); Quinton R. Prys, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 105 days.

(21) Appl. No.: 15/953,660

(22) Filed: Apr. 16, 2018

(65) Prior Publication Data

US 2018/0299594 A1    Oct. 18, 2018

Related U.S. Application Data

(60) Provisional application No. 62/486,071, filed on Apr. 17, 2017.

(51) Int. Cl.
*G02B 5/08* (2006.01)
*B60R 1/04* (2006.01)
*G02B 1/14* (2015.01)

(52) U.S. Cl.
CPC .............. *G02B 5/0808* (2013.01); *B60R 1/04* (2013.01); *G02B 1/14* (2015.01)

(58) Field of Classification Search
CPC ............ G02B 5/0808; G02B 1/14; B60R 1/04
See application file for complete search history.

(56) References Cited

U.S. PATENT DOCUMENTS

| | | | |
|---|---|---|---|
| 4,435,042 | A | 3/1984 | Wood et al. |
| 4,436,371 | A | 3/1984 | Wood et al. |
| 4,826,289 | A | 5/1989 | Vandenbrink et al. |
| 4,936,533 | A | 6/1990 | Adams et al. |
| 4,948,242 | A | 8/1990 | Desmond et al. |
| 5,100,095 | A | 3/1992 | Haan et al. |
| 5,327,288 | A | 7/1994 | Wellington et al. |
| 5,555,136 | A | 9/1996 | Waldmann et al. |
| 5,582,383 | A | 12/1996 | Mertens et al. |
| 5,680,263 | A | 10/1997 | Zimmermann et al. |
| 5,798,688 | A | 8/1998 | Schofield |
| 5,820,097 | A | 10/1998 | Spooner |
| 5,984,482 | A | 11/1999 | Rumsey et al. |
| 6,227,675 | B1 | 5/2001 | Mertens et al. |

(Continued)

*Primary Examiner* — Isiaka O Akanbi
*Assistant Examiner* — Danell L Owens
(74) *Attorney, Agent, or Firm* — Honigman LLP

(57) ABSTRACT

A vehicular interior prismatic rearview mirror assembly includes a mirror casing and a prismatic reflective element disposed at the mirror casing and comprising a glass mirror substrate. The mirror substrate has a forward rounded perimeter region that is contactable and viewable by the driver of the vehicle and that provides a rounded transition between a front surface and a perimeter edge of the substrate. The mirror substrate has a rear perimeter edge region chamfered to form an angled surface between the rear surface and the perimeter edge. A reflector coating and a protective coating are disposed at the rear surface. An encapsulant is disposed about a perimeter region of the rear surface so as to encompass and overlay a portion of the angled surface and the reflector coating and the protective coating at the rear surface, with no part of the encapsulant being disposed at the forward rounded perimeter region.

20 Claims, 11 Drawing Sheets

(56) References Cited

U.S. PATENT DOCUMENTS

| | | |
|---|---|---|
| 6,229,319 B1 | 5/2001 | Johnson |
| 6,315,421 B1 | 11/2001 | Apfelbeck et al. |
| 6,318,870 B1 | 11/2001 | Spooner et al. |
| 6,329,925 B1 | 12/2001 | Skiver et al. |
| 6,439,755 B1 | 8/2002 | Fant, Jr. et al. |
| 6,483,438 B2 | 11/2002 | DeLine et al. |
| 6,501,387 B2 | 12/2002 | Skiver et al. |
| 6,540,193 B1 | 4/2003 | DeLine |
| 6,593,565 B2 | 7/2003 | Heslin et al. |
| 6,598,980 B2 | 7/2003 | Marusawa et al. |
| 6,690,268 B2 | 2/2004 | Schofield et al. |
| 6,877,709 B2 | 4/2005 | March et al. |
| 7,184,190 B2 | 2/2007 | McCabe et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,626,749 B2 | 12/2009 | Baur et al. |
| 8,049,640 B2 | 11/2011 | Uken et al. |
| 8,277,059 B2 | 10/2012 | McCabe et al. |
| 8,451,332 B2 | 5/2013 | Rawlings |
| 8,508,831 B2 | 8/2013 | De Wind et al. |
| 8,529,108 B2 | 9/2013 | Uken et al. |
| 8,730,553 B2 | 5/2014 | De Wind et al. |
| 9,346,403 B2 | 5/2016 | Uken et al. |
| 9,598,016 B2 | 3/2017 | Blank et al. |
| 2006/0050018 A1 | 3/2006 | Hutzel et al. |
| 2006/0061008 A1 | 3/2006 | Kamer et al. |
| 2007/0153356 A1* | 7/2007 | McCabe ............. F21S 43/14 359/265 |
| 2010/0085653 A1 | 4/2010 | Uken et al. |
| 2012/0038964 A1* | 2/2012 | De Wind ............. B60R 1/04 359/265 |
| 2012/0236388 A1* | 9/2012 | De Wind ............. B60R 1/04 359/267 |
| 2014/0313563 A1* | 10/2014 | Uken ............. B60R 1/088 359/267 |
| 2015/0097955 A1 | 4/2015 | De Wind et al. |
| 2016/0068108 A1 | 3/2016 | Uken et al. |

\* cited by examiner larger 1.5 mm edge seam

Current frameless prismatic

This mirror was cut to show the 1.5 mm zone from the edge of the mirror.

FIG. 11 — encapsulant covers the exposed edge of the window and not the middle of the window.

FIG. 12 — protect exposed edges by applying a film on window to protect exposed silver

FRAMELESS PRISMATIC MIRROR WITH IMPROVED EDGE PROTECTION

CROSS REFERENCE TO RELATED APPLICATION

The present application claims the filing benefits of U.S. provisional application Ser. No. 62/486,071, filed Apr. 17, 2017, which is hereby incorporated herein by reference in its entirety.

FIELD OF THE INVENTION

The present invention relates generally to the field of interior rearview mirror assemblies for vehicles.

BACKGROUND OF THE INVENTION

It is known to provide a mirror reflective element for an interior or exterior rearview mirror assembly of a vehicle. If the mirror is frameless, the perimeter edge of the mirror reflective element may be exposed.

SUMMARY OF THE INVENTION

The present invention provides an interior rearview mirror assembly that has a frameless mirror reflective element with exposed rounded perimeter edges. The rear surface of the mirror substrate is chamfered or seamed at the periphery, and an encapsulant is disposed partially over the chamfered or seamed surface and partially over the planar rear surface of the reflective element to seal and partially cover the periphery of a conformal coating at the rear surface of the mirror substrate.

These and other objects, advantages, purposes and features of the present invention will become apparent upon review of the following specification in conjunction with the drawings.

BRIEF DESCRIPTION OF THE DRAWINGS

FIGS. 11-12 are photos showing a mirror substrate with a window through the reflective coating and paint for a touch sensor, with FIG. 11 showing an encapsulant disposed around the window.

DESCRIPTION OF THE PREFERRED EMBODIMENTS

Figure 1:
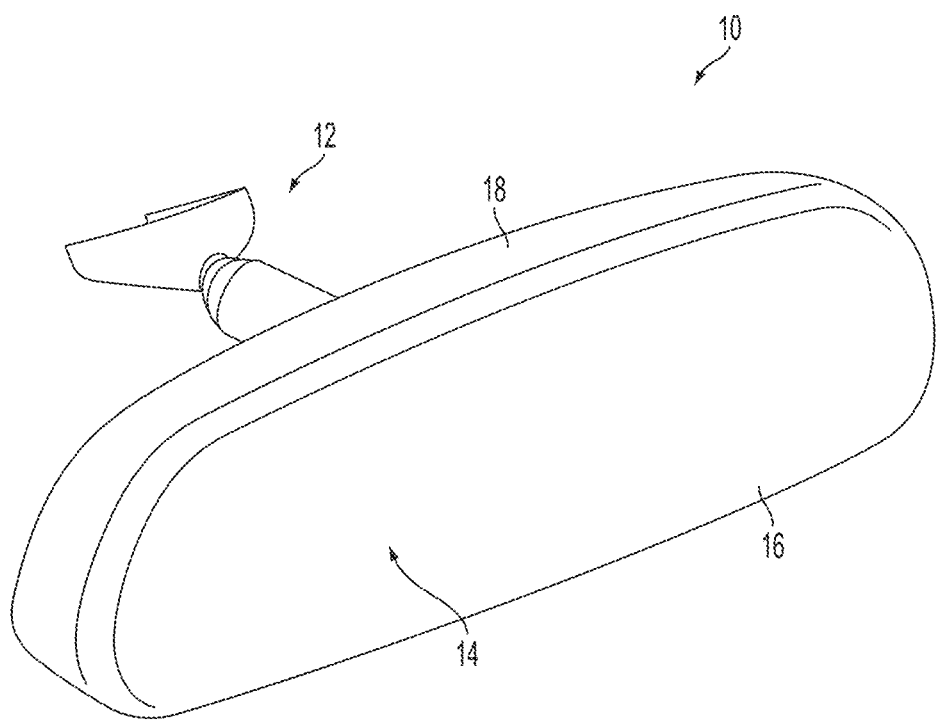
FIG. 1 is a perspective view of an interior rearview mirror assembly in accordance with the present invention.
Figure 2:
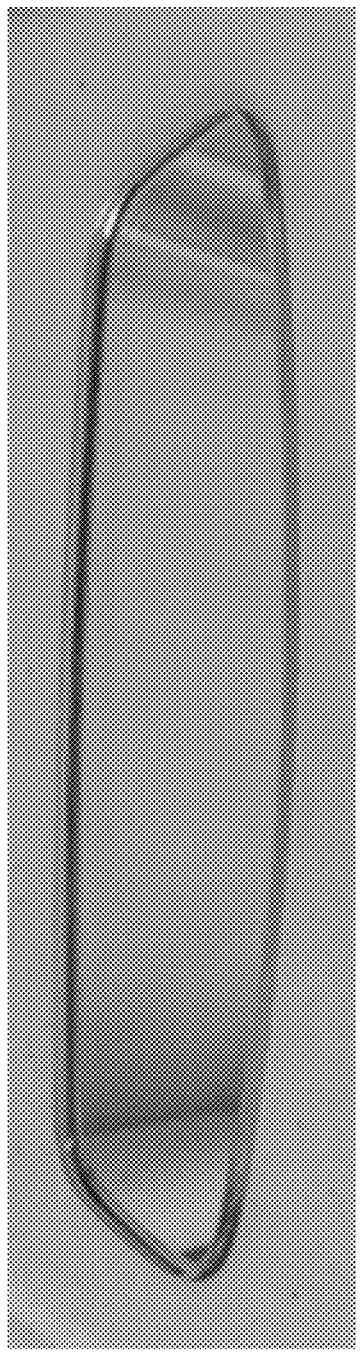
FIG. 2 is a front plan view of a mirror substrate for a frameless interior mirror.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16.

Figure 5:
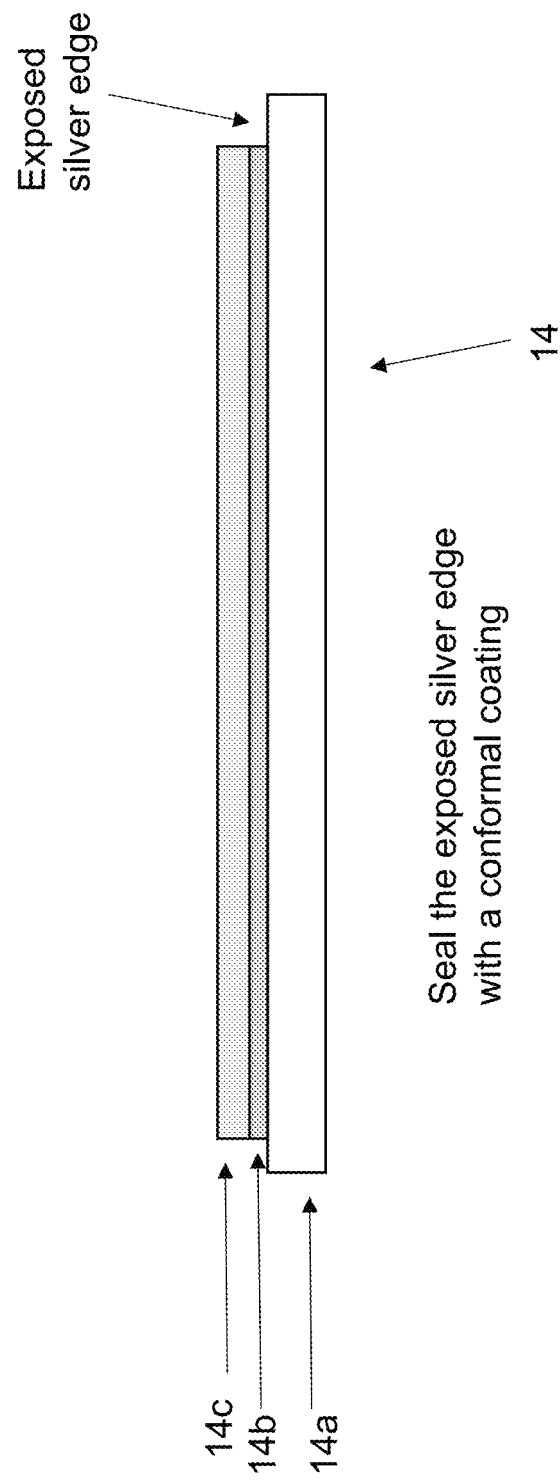
FIG. 5 is a side elevation of a mirror substrate having a reflective layer and a reflective layer with a protective paint layer at the rear surface of the mirror substrate.
Figure 6:
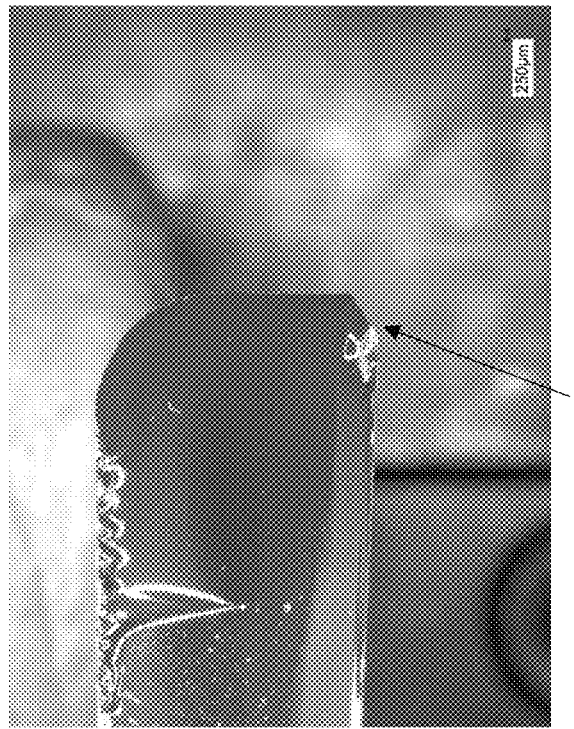
FIG. 6 shows photographs of a non-chamfered mirror substrate and a chamfered or seamed mirror substrate.
Figure 6:
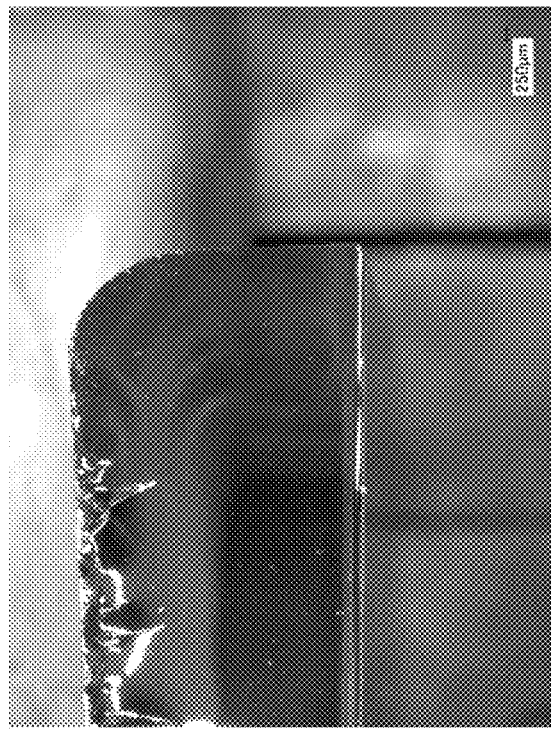
Figure 7:
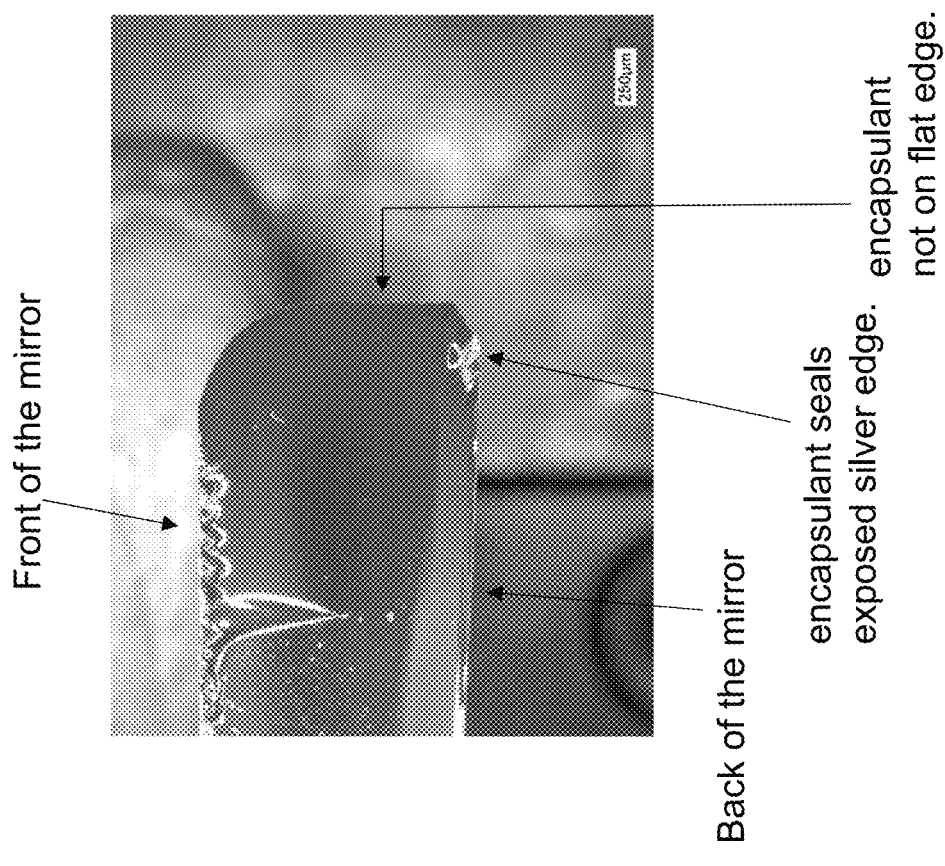
FIG. 7 is another photograph of the chamfered or seamed mirror substrate.
Figure 8:
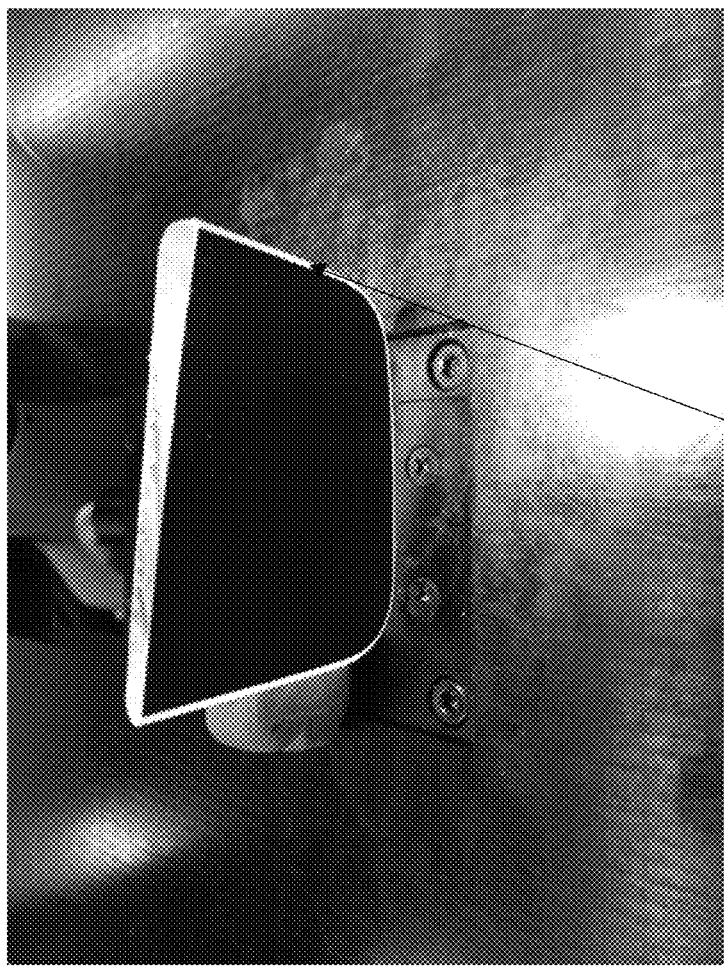
FIG. 8 is a photograph of a cut mirror substrate showing the seamed perimeter edge.

In the illustrated embodiments, the reflective element comprises a prismatic reflective element that is attached at the mirror casing so that its perimeter edge is exposed. As shown in FIG. 5, the reflective element 14 includes a glass substrate 14a, with a reflective silver layer 14b disposed at a rear surface of the glass substrate, and with an opaque layer or paint 14c disposed over the rear surface of the reflective layer.

The mirror assembly may comprise any suitable construction, such as, for example, a mirror assembly having a prismatic reflective element that is disposed at an outer perimeter edge of the mirror casing and with the prismatic substrate having curved or beveled perimeter edges, such as described in U.S. Publication Nos. US-2016-0068108 and/or US-2015-0097955, and/or U.S. Pat. Nos. 8,508,831; 8,730,553; 9,598,016 and/or 9,346,403, which are all hereby incorporated herein by reference in their entireties (and with electrochromic and prismatic mirrors of such construction are commercially available from the assignee of this application under the trade name INFINITY™ mirror).

Figure 3:
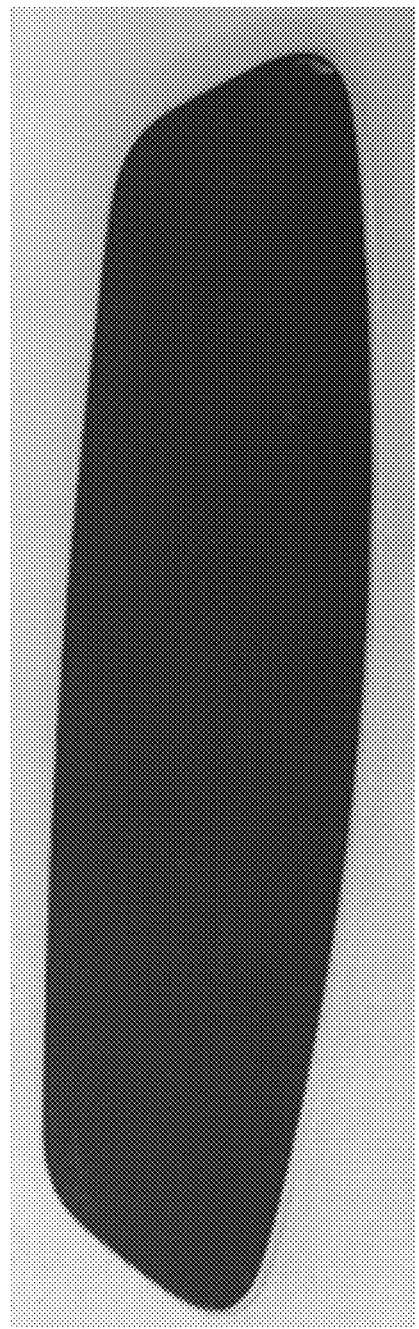
FIG. 3 is a rear plan view of the mirror substrate of FIG. 2.
Figure 4:
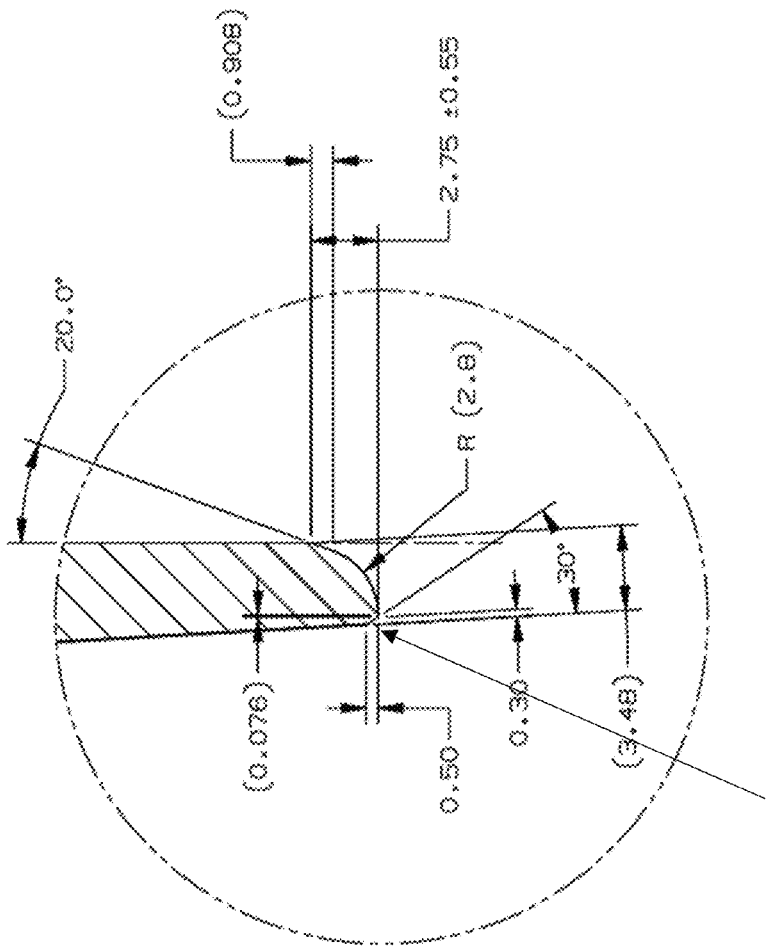
FIG. 4 is a sectional view of a perimeter edge region of a mirror substrate with rounded perimeter edge.

As shown in FIG. 3, typically the rear surface of the prismatic mirror substrate is coated with an opaque layer or paint that covers and protects the reflector coating at the rear of the substrate. That layer extends to the rear perimeter edge of the mirror substrate so as to fully cover and protect the silver or reflective layer. However, the opaque layer does not cover the edges of the reflective layer such that the silver is exposed around its periphery. It is difficult to seal the periphery of the opaque layer and reflective layer at or near the exposed edge without having some of the sealant intrude onto the exposed perimeter edge of the mirror substrate.

In order to provide a larger area at which to apply an encapsulant or sealant (such as an elastomeric sealant that is dispensed, for example, as a bead of sealant, in an uncured liquid state and cures to a cured state) to seal the periphery of the opaque layer and reflective layer, the mirror reflective element has its rear perimeter edges chamfered or seamed, with the rear edges having at least a 1 mm edge seam and preferably a 1.5 mm edge seam. The chamfered rear perimeter edge allows room for an encapsulate (FIG. 11) to be disposed over the periphery of the opaque layer to seal the periphery of the opaque layer without having the encapsulant intrude onto the outer perimeter edge of the substrate or the exposed surface of the substrate.

The mirror reflective element thus includes an edge encapsulant on and over the exposed silver edge. In the illustrated embodiment, the rear perimeter edge region of the substrate is ground about 1.5 mm at the back of the mirror to pull the silver away from the edge. This makes it easier to encapsulate that edge without getting the encapsulant on the polished edge. With the frameless (having rounded exposed perimeter edges) mirror design, pulling the silver inward by 1.5 mm or 2.0 mm does not show the same as a normal prismatic element since the edge has the rounded design and that changes the optics so a person viewing the reflective element (when installed in a mirror assembly in a vehicle) does not see the silver edge and does not see the encapsulant. The encapsulation can either be done with dispensing, jetting, pad printing, digital inkjet printing, spraying a conformal coating or by laminating a film on the back of the mirror substrate. For prismatic INFINITY™ mirrors with a touch sensor function, the film option may be desired.

The concept is to seal the exposed silver edge. For frameless mirrors, it is more difficult to do this and have no spill or residue on the edge. With conventional prismatic mirrors, the bezel would cover the edge and any conformal coating that might get onto the edge, so sealing the silver coating can be done without concern with intruding onto the perimeter edge of the non-exposed substrate.

With frameless mirrors, the edge is contoured, so that the silver edge may be less visible than standard prisms. This makes it easier to bring the silver edge in or add a conformal coating on the back. The edge is less visible when viewed from the front.

With such frameless mirrors, the 1.5 mm chamfered edge is ground at the back of the mirror substrate, which brings the exposed silver edge in away from the edge. This edge can now be sealed with a conformal coating without too much concern about getting the conformal coating on the polished edge of the mirror.

Figure 9:
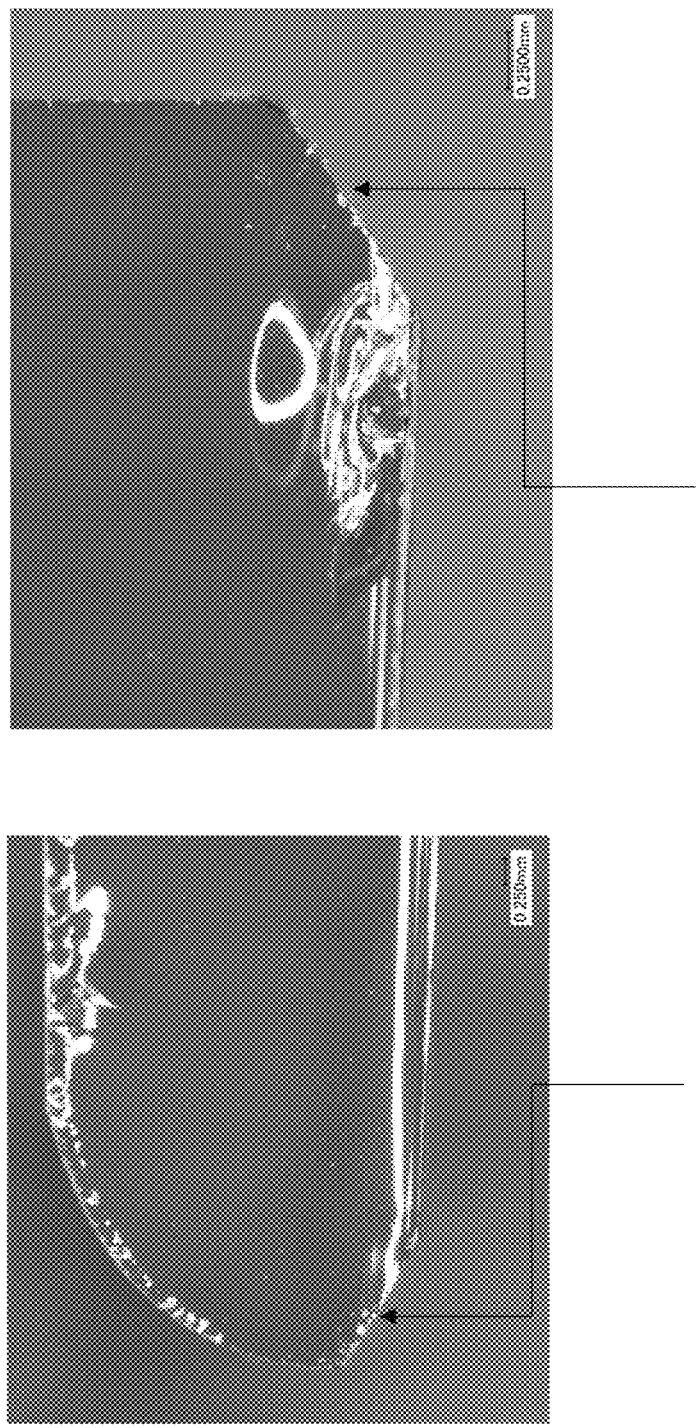
FIG. 9 shows enlarged photographs of the chamfered or seamed mirror substrate.
Figure 10:
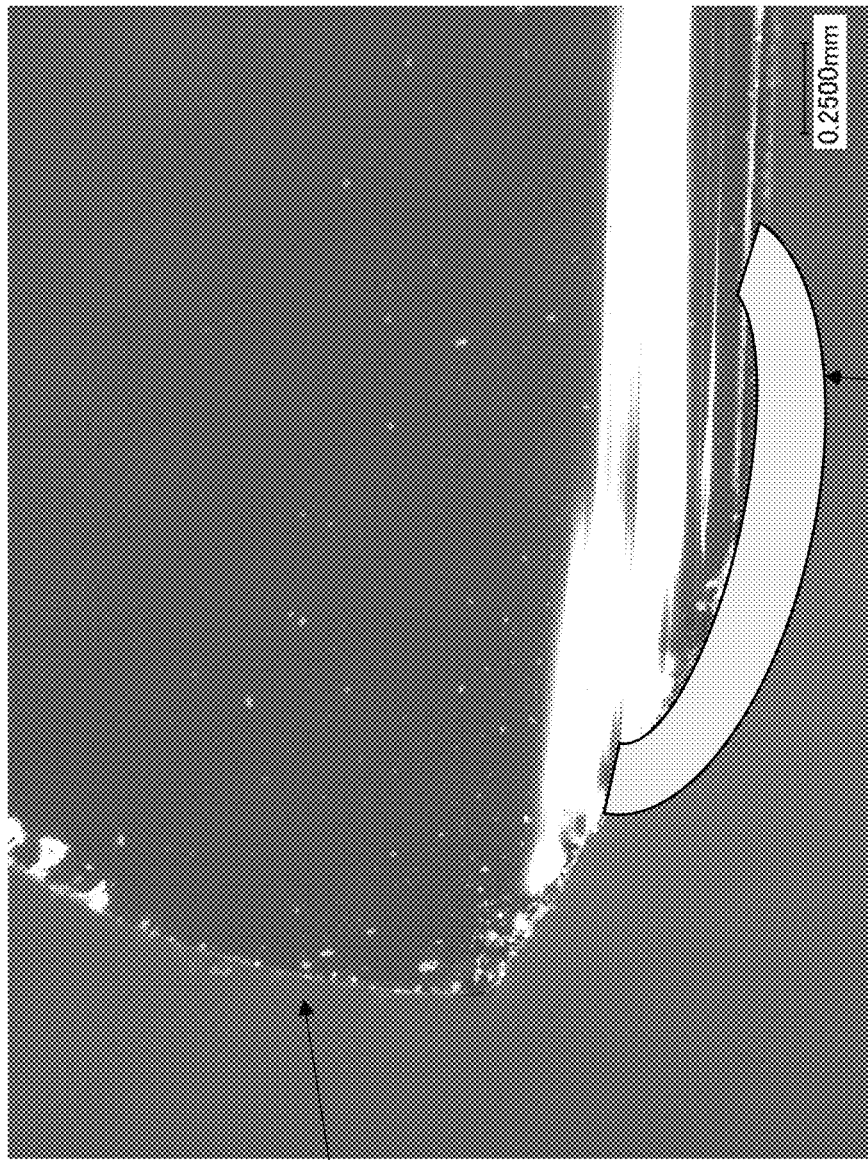
FIG. 10 shows an encapsulant disposed over the paint and reflective coating and partially over the chamfered surface.

As best shown in FIG. 9, the 1.5 mm edge seam at the rear surfaces is angled relative to the planar rear surface of the substrate. The chamfered edge may have a 30 degree angle relative to the planar rear surface of the mirror substrate, preferably less than 30 degrees, and preferably less than 20 degrees, such as less than 15 degrees, such as, for example, around 10 degrees or thereabouts. This improves the final packaging. With a 30 degree seam angle, there may be a gap between the mirror substrate and the housing, but with only a 10 degree seam angle, the gap will be very small and not readily noticeable to a person viewing the mirror in a vehicle.

For frameless mirrors that have the touch option and a window (see FIGS. 12 and 13), the exposed silver edge in the window area can be protected with a clear tape and a clear adhesive/PSA. It may be possible to seal this window with a conformal coating (as shown in FIG. 12), but it may be difficult to get an optically clear coating on the window by spraying or jetting that would look as good as a laminated tape.

Optionally, such a tape may be applied to the edge of the mirror substrate and that may be in the form of a transfer film where the material conforms to the chamfered edge and stays in place. The conformal coating and the adhesive in the tape should be ionically pure and not interact chemically or electrochemically with silver and cause corrosion.

Optionally, the conformal coating may be applied by dispensing, spraying or jetting. A typical thickness for the conformal coating is 1 to 5 mils (25 to 125 microns). The conformal coatings can be UV curable, moisture curable or heat curable or ambient curable. They can be silicones, polyurethanes, epoxies, or the like.

The reflective element and mirror casing of the mirror assembly of the present invention are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Pat. Pub. No. US-2006-0061008, and/or PCT Application No. PCT/US2010/028130, filed Mar. 22, 2010, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having the reflective element at least partially nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or U.S. Publication Nos. US-2016-0068108 and/or US-2015-0097955, and/or U.S. Pat. Nos. 8,508,831; 8,730,553; 9,598,016 and/or 9,346,403, which are hereby incorporated herein by reference in their entireties (and with electrochromic and prismatic mirrors of such construction are commercially available from the assignee of this application under the trade name INFINITY™ mirror).

In the illustrated embodiment, the glass substrate has a thickness of about 3.2 mm and a radius of curvature of the perimeter edge of about 2.8 mm or thereabouts, such that the full radius (the curved transition from the generally planar front substrate to the generally planar surface of the mirror casing) is on the glass perimeter edge. The outermost portion of the perimeter edge of the front glass substrate extends slightly outboard of the mirror casing such that the mirror casing is not exposed or viewable around the glass substrate by a person viewing the mirror assembly from in front of the glass substrate.

The reflective element has the outer perimeter edge region of the glass substrate rounded or curved or radiused so that the radiused glass is exposed to and viewable by the driver of the vehicle. Optionally, the radiused glass perimeter edge region may be polished to provide a smooth water-clear surface at the perimeter edge of the glass substrate, with the perimeter band disposed behind the radiused portion to hide the perimeter seal and provide a reflective area at the perimeter seal and outboard thereof. Optionally, the radiused glass perimeter edge region may be frosted or non-water-clear to provide a frosted or non-smooth appearance around the periphery of the mirror reflective element.

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, published Apr. 8, 2010, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, published Apr. 8, 2010, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or U.S. Pat. Pub. Nos. US-2003-0007261; US-2006-0061008; US-2006-0050018; US-2009-0015736; US-2009-0015736 and/or US-2010-0097469, and/or PCT Application No. PCT/US10/47256, filed Aug. 31, 2010, which are all hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, and/or in U.S. Pat. Pub. Nos. US-2006-0061008 and/or US-2006-0050018, which are all hereby incorporated herein by reference in their entireties.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. An interior prismatic rearview mirror assembly for a vehicle, said interior prismatic rearview mirror assembly comprising:

a mirror casing;

a prismatic reflective element disposed at said mirror casing and comprising a glass mirror substrate that overlaps a front portion of said mirror casing;

wherein said glass mirror substrate has a front surface and a rear surface, said front surface being closer to a driver of a vehicle when the interior rearview mirror assembly is normally mounted in the vehicle;

wherein said rear surface of said glass mirror substrate has a reflector coating established thereat, with a protective coating disposed over said reflector coating;

wherein said glass mirror substrate has a perimeter edge that circumscribes said glass mirror substrate and spans between said front and rear surfaces, and wherein said glass mirror substrate has a forward rounded perimeter region that provides a curved transition between said front surface and said perimeter edge;

wherein said forward rounded perimeter region is contactable and viewable by the driver of the vehicle;

wherein said glass mirror substrate has a rear perimeter edge region chamfered so that an angled surface is disposed between said rear surface and said perimeter edge;

wherein said chamfered rear perimeter edge region of said glass mirror substrate extends at least 1.5 mm inboard from said perimeter edge of said glass mirror substrate;

wherein said reflector coating and said protective coating are disposed at said rear surface where said angled surface meets said rear surface;

an encapsulant disposed about a perimeter region of said rear surface so as to encompass and overlay said reflector coating and said protective coating at said rear surface and so as to encompass and overlay a portion of said angled surface; and wherein no part of said encapsulant is disposed at said forward rounded perimeter region.

2. The rearview mirror assembly of claim 1, wherein said chamfered rear perimeter edge region of said glass mirror substrate extends at least 2 mm inboard from said perimeter edge of said glass mirror substrate.

3. The rearview mirror assembly of claim 1, wherein said angled surface is at an angle of less than 30 degrees relative to said rear surface and greater than zero degrees relative to said rear surface.

4. The rearview mirror assembly of claim 1, wherein said angled surface is at an angle of 10 degrees relative to said rear surface.

5. The rearview mirror assembly of claim 1, wherein said forward rounded perimeter region of said glass mirror substrate has a radius of curvature that is less than a thickness dimension of said glass mirror substrate.

6. The rearview mirror assembly of claim 1, wherein said forward rounded perimeter region has a polished water-clear surface finish.

7. The rearview mirror assembly of claim 1, wherein said forward rounded perimeter region has a frosted or non-water-clear surface finish.

8. The rearview mirror assembly of claim 1, wherein said encapsulant comprises a sealant that is dispensed about the perimeter region of said rear surface in an uncured state and that cures to a cured state.

9. The rearview mirror assembly of claim 1, wherein said encapsulant is disposed about the perimeter region of said rear surface by one of jetting, pad printing, digital inkjet printing, spraying a conformal coating about the perimeter region of said rear surface.

10. The rearview mirror assembly of claim 1, wherein said protective coating comprises an opaque layer that covers and protects said reflector coating at said rear surface of said glass mirror substrate.

11. The rearview mirror assembly of claim 1, wherein said prismatic reflective element comprises a window region inboard of the perimeter edge, and wherein said window region is devoid of said reflector coating and said protective coating, and wherein a second encapsulant is disposed at said rear surface about a periphery of said window region so as to encompass and overlay said reflector coating and said protective coating around said window region and so as to encompass and overlay the periphery of said window region and so as to not encompass or overlay a center part of said window region.

12. An interior prismatic rearview mirror assembly for a vehicle, said interior prismatic rearview mirror assembly comprising:

a mirror casing;

a prismatic reflective element disposed at said mirror casing and comprising a glass mirror substrate that overlaps a front portion of said mirror casing;

wherein said glass mirror substrate has a front surface and a rear surface, said front surface being closer to a driver of a vehicle when the interior rearview mirror assembly is normally mounted in the vehicle;

wherein said rear surface of said glass mirror substrate has a reflector coating established thereat;

wherein said glass mirror substrate has a perimeter edge that circumscribes said glass mirror substrate and spans between said front and rear surfaces, and wherein said glass mirror substrate has a forward rounded perimeter region that provides a curved transition between said front surface and said perimeter edge;

wherein said forward rounded perimeter region is contactable and viewable by the driver of the vehicle;

wherein said glass mirror substrate has a rear perimeter edge region chamfered so that an angled surface is disposed between said rear surface and said perimeter edge;

wherein said chamfered rear perimeter edge region of said glass mirror substrate extends at least 1.5 mm inboard from said perimeter edge of said glass mirror substrate;

wherein said angled surface is at an angle of less than 15 degrees relative to said rear surface and greater than zero degrees relative to said rear surface;

wherein said reflector coating is disposed at said rear surface where said angled surface meets said rear surface;

an encapsulant disposed about a perimeter region of said rear surface so as to encompass and overlay said reflector coating at said rear surface and so as to encompass and overlay a portion of said angled surface where said reflector coating is not disposed; and wherein no part of said encapsulant is disposed at said forward rounded perimeter region.

13. The rearview mirror assembly of claim 12, wherein a protective layer is disposed over said reflector coating, and wherein said encapsulant is disposed about the perimeter region of said rear surface so as to encompass and overlay said protective layer at said rear surface and so as to encompass and overlay a portion of said angled surface where said protective layer is not disposed, and wherein said protective layer comprises an opaque layer that covers and protects said reflector coating at said rear surface of said glass mirror substrate.

14. The rearview mirror assembly of claim 12, wherein said prismatic reflective element comprises a window region inboard of the perimeter edge, and wherein said window region is devoid of said reflector coating, and wherein a second encapsulant is disposed at said rear surface about a periphery of said window region so as to encompass and overlay said reflector coating around said window region and so as to encompass and overlay the periphery of said window region and so as to not encompass or overlay a center part of said window region.

15. An interior prismatic rearview mirror assembly for a vehicle, said interior prismatic rearview mirror assembly comprising:

a mirror casing;

a prismatic reflective element disposed at said mirror casing and comprising a glass mirror substrate that overlaps a front portion of said mirror casing;

wherein said glass mirror substrate has a front surface and a rear surface, said front surface being closer to a driver of a vehicle when the interior rearview mirror assembly is normally mounted in the vehicle;

wherein said rear surface of said glass mirror substrate has a reflector coating established thereat, with a protective coating disposed over said reflector coating;

wherein said glass mirror substrate has a perimeter edge that circumscribes said glass mirror substrate and spans between said front and rear surfaces, and wherein said glass mirror substrate has a forward rounded perimeter region that provides a curved transition between said front surface and said perimeter edge;

wherein said forward rounded perimeter region is contactable and viewable by the driver of the vehicle;

wherein said glass mirror substrate has a rear perimeter edge region chamfered so that an angled surface is disposed between said rear surface and said perimeter edge;

wherein said chamfered rear perimeter edge region of said glass mirror substrate extends at least 1.5 mm inboard from said perimeter edge of said glass mirror substrate;

wherein said reflector coating and said protective coating are disposed at said rear surface where said angled surface meets said rear surface;

a first encapsulant disposed about a perimeter region of said rear surface so as to encompass and overlay said reflector coating and said protective coating at said rear surface and so as to encompass and overlay a portion of said angled surface;

wherein no part of said first encapsulant is disposed at said forward rounded perimeter region;

wherein said prismatic reflective element comprises a window region inboard of the perimeter edge, and wherein said window region is devoid of said reflector coating and said protective coating;

wherein a second encapsulant is disposed at said rear surface about a periphery of said window region so as to encompass and overlay said reflector coating and said protective coating around the periphery of said window region and so as to encompass and overlay the periphery of said window region that is devoid of said reflector coating and said protective coating; and wherein no part of said second encapsulant is disposed at a center part of said window region.

16. The rearview mirror assembly of claim 15, wherein said forward rounded perimeter region of said glass mirror substrate has a radius of curvature that is less than a thickness dimension of said glass mirror substrate.

17. The rearview mirror assembly of claim 15, wherein said first encapsulant comprises a sealant that is dispensed about the perimeter region of said rear surface in an uncured state and that cures to a cured state.

18. The rearview mirror assembly of claim 15, wherein said second encapsulant comprises a sealant that is dispensed about the periphery of said window region in an uncured state and that cures to a cured state.

19. The rearview mirror assembly of claim 15, wherein said first and second encapsulants are disposed by one of jetting, pad printing, digital inkjet printing, spraying a conformal coating at said glass mirror substrate.

20. The rearview mirror assembly of claim 15, wherein said protective coating comprises an opaque layer that covers and protects said reflector coating at said rear surface of said glass mirror substrate.

* * * * *